United States Patent

Ninomiya

(10) Patent No.: US 10,122,880 B2
(45) Date of Patent: Nov. 6, 2018

(54) IMAGE FORMING APPARATUS

(71) Applicant: KYOCERA Document Solutions Inc., Osaka (JP)

(72) Inventor: Yuichi Ninomiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/819,831

(22) Filed: Nov. 21, 2017

(65) Prior Publication Data

US 2018/0146108 A1    May 24, 2018

(30) Foreign Application Priority Data

Nov. 24, 2016  (JP) .................. 2016-227554

(51) Int. Cl.
| | |
|---|---|
| *G03G 15/20* | (2006.01) |
| *G03G 15/00* | (2006.01) |
| *G03G 21/20* | (2006.01) |
| *H02S 20/30* | (2014.01) |
| *H02J 7/35* | (2006.01) |
| *H04N 1/00* | (2006.01) |

(52) U.S. Cl.
CPC ....... *H04N 1/00896* (2013.01); *G03G 15/205* (2013.01); *G03G 15/2039* (2013.01); *G03G 15/5004* (2013.01); *G03G 15/80* (2013.01); *H02S 20/30* (2014.12); *H04N 1/00904* (2013.01); *G03G 21/20* (2013.01); *G03G 2215/00978* (2013.01); *G03G 2215/00983* (2013.01); *G03G 2221/1696* (2013.01); *H02J 7/35* (2013.01); *H04N 2201/0094* (2013.01)

(58) Field of Classification Search
CPC ............ G03G 15/2039; G03G 15/205; G03G 15/2078; G03G 15/5004; G03G 15/80; G03G 21/20; G03G 2215/00978; G03G 2215/00983; G03G 2221/1696; H04N 1/00896; H04N 1/00904; H04N 2201/0094; H02S 20/30; H02J 7/35
See application file for complete search history.

(56) References Cited

U.S. PATENT DOCUMENTS

| | | | |
|---|---|---|---|
| 2012/0204046 A1* | 8/2012 | Baba ................ | G06F 1/3231 713/323 |
| 2015/0311731 A1* | 10/2015 | Tatsumoto ............ | H02J 7/0021 320/107 |
| 2017/0235271 A1* | 8/2017 | Shiraishi ............ | G03G 15/2017 399/88 |

FOREIGN PATENT DOCUMENTS

JP    2015-1895 A    1/2015

* cited by examiner

Primary Examiner — Joseph S Wong
(74) Attorney, Agent, or Firm — Stein IP, LLC

(57) ABSTRACT

An image forming apparatus includes a fixing portion, a temperature detection portion, a power supply portion, a control portion, a photovoltaic module and a power storage/supply portion which stores power from the photovoltaic module and which performs power supply to the temperature detection portion when power supply from the power supply portion to the temperature detection portion is stopped. The control portion detects, when a return condition is satisfied, the temperature of the fixing portion based on the output of the temperature detection portion, and as a temperature on return is higher, the control portion starts fixing return processing at later timing whereas as the temperature on return is lower, the control portion starts the fixing return processing at earlier timing.

8 Claims, 9 Drawing Sheets

DIRECTION OF EXTENSION

IMAGE FORMING APPARATUS

INCORPORATION BY REFERENCE

This application is based upon and claims the benefit of priority from the corresponding Japanese Patent Application No. 2016-227554 filed on Nov. 24, 2016, the entire contents of which are incorporated herein by reference.

BACKGROUND

The present disclosure relates to an image forming apparatus that has a power saving mode in which power consumption is reduced.

Conventionally, an image forming apparatus is known that has, as power supply modes, a normal mode and a power saving mode in which power consumption is reduced as compared with the normal mode.

In the conventional image forming apparatus, when a time which elapses without use of the image forming apparatus reaches a predetermined time or when an operation is performed on a power saving key provided in an operation panel, the normal mode is changed to the power saving mode. When the image forming apparatus changes to the power saving mode, power supply to most portions of the image forming apparatus such as an image reading portion and a print portion is stopped.

SUMMARY

An image forming apparatus according to an aspect of the present disclosure has a normal mode and a power saving mode in which power consumption is reduced as compared with the normal mode, returns to the normal mode when a predetermined return condition is satisfied in the power saving mode and includes a fixing portion, a temperature detection portion, a power supply portion, a control portion, a photovoltaic module and a power storage/supply portion. The fixing portion includes a fixing member which receives power supply so as to increase in temperature and fixes an image printed on a sheet to the sheet with the fixing member whose temperature is increased to a predetermined temperature. The temperature detection portion receives power supply so as to output a voltage corresponding to the temperature of the fixing portion. The power supply portion performs the power supply to the fixing portion and the temperature detection portion in the normal mode and stops the power supply to the fixing portion and the temperature detection portion in the power saving mode. The control portion detects, based on the output of the temperature detection portion, the temperature of the fixing portion so as to perform temperature control on the fixing portion and returns the image forming apparatus to the normal mode by performing predetermined return processing including fixing return processing in which when the return condition is satisfied, the temperature of the fixing portion is increased to the predetermined temperature. The photovoltaic module receives light so as to generate electric power. The power storage/supply portion stores the power output from the photovoltaic module and performs power supply to the temperature detection portion when the power supply from the power supply portion to the temperature detection portion is stopped. The control portion detects, when the return condition is satisfied, the temperature of the fixing portion based on the output of the temperature detection portion, and as a temperature on return that is the detected temperature is higher, the control portion starts the fixing return processing at later timing whereas as the temperature on return is lower, the control portion starts the fixing return processing at earlier timing.

DETAILED DESCRIPTION

An image forming apparatus according to an embodiment of the present disclosure will be described using a multifunctional machine as an example.

<Overall Configuration of Multifunctional Machine>

Figure 1:
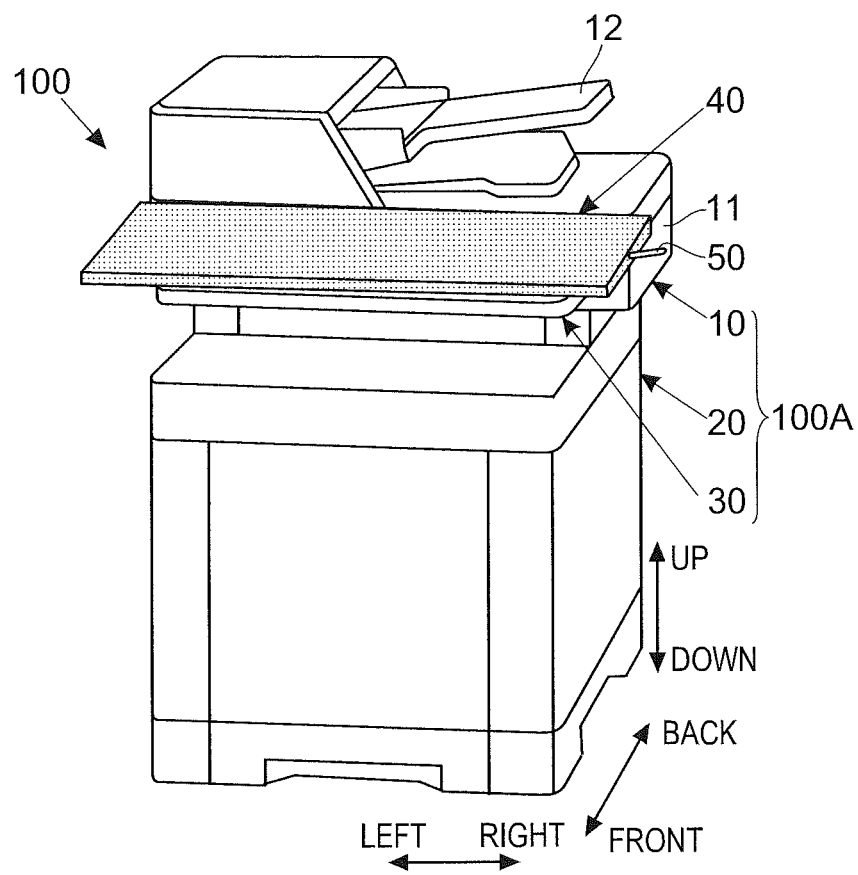
FIG. 1 is a perspective view showing an overall configuration of a multifunctional machine according to an embodiment of the present disclosure.

As shown in FIG. 1, the main body 100A of a multifunctional machine 100 according to the present embodiment is formed with an image reading portion 10, a print portion 20, an operation panel 30 and the like. A photovoltaic module 40 is fitted to the main body 100A. In FIG. 1, the photovoltaic module 40 is indicated by a dot pattern.

The image reading portion 10 optically reads an original document so as to produce image data on the original document. The optical system members (unillustrated) of the image reading portion 10 such as an image sensor are arranged within the housing 11 (hereinafter referred to as the reading housing 11) of the image reading portion 10. The image reading portion 10 includes an original document transport device unit 12 for automatically transporting the original document to a reading position. The original document transport unit 12 can be turned about a turning shaft (unillustrated) which is provided in a portion of the reading housing 11 on the side of a back surface and which serves as a pivot.

The print portion 20 transports a sheet stored in the main body 100A to a print position, and also forms a toner image based in the image data (such as the image data of the original document) of an image to be printed. Then, when the sheet which is being transported is passed through the print position, the print portion 20 transfers the toner image to the sheet.

Figure 2:
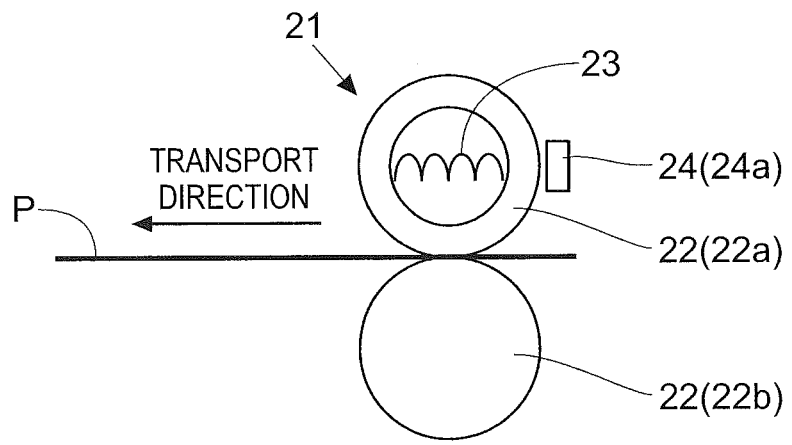
FIG. 2 is a diagram showing the configuration of a fixing portion in the multifunctional machine according to the embodiment of the present disclosure.

As shown in FIG. 2, the print portion 20 includes a fixing portion 21 for fixing, to the sheet P, the toner image transferred to the sheet (in FIG. 2, a symbol "P" is added). The fixing portion 21 includes a fixing roller pair 22 (which corresponds to a "fixing member") which is formed with a heating roller 22a and a pressure roller 22b. The heating roller 22a incorporates a heater 23. The pressure roller 22b is pressed onto the heating roller 22a so as to form a fixing nip between the pressure roller 22b and the heating roller 22a. The fixing roller pair 22 is heated with the heater 23 to a predetermined temperature. Then, the fixing roller pair 22 heats and pressurizes the sheet P which is passed through the fixing nip so as to fix, to the sheet P, the toner image transferred to the sheet P.

Figure 3:
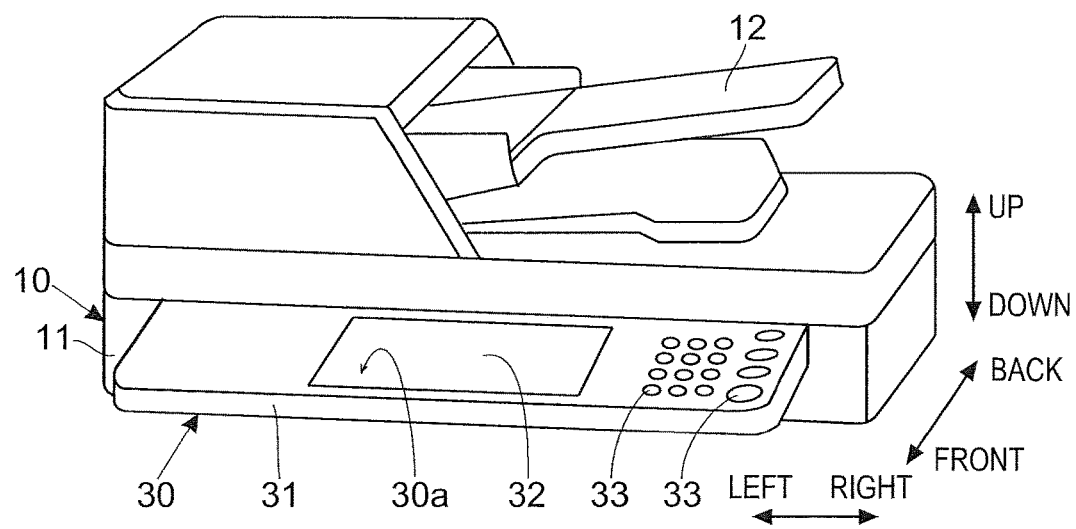
FIG. 3 is a perspective view showing the configuration of an operation panel which is fitted to the multifunctional machine according to the embodiment of the present disclosure.

As shown in FIG. 3, the operation panel 30 is arranged on the side of the front surface of the reading housing 11 such that its operation surface 30a (the surface which is directed upward) is inclined obliquely downward from back to front. For example, a housing 31 (hereinafter referred to as the panel housing 31) which forms the enclosure of the operation panel 30 is fixed to a portion of the reading housing 11 on the side of the front surface. In FIG. 3, for convenience, the photovoltaic module 40 is omitted.

In the operation surface 30a of the operation panel 30, a touch panel display 32 and hardware keys 33 are arranged. The touch panel display 32 and the hardware keys 33 are held within the panel housing 31 and are exposed to the outside through openings formed in the upper surface (that is, the operation surface 30a) of the panel housing 31. The touch panel display 32 corresponds to a "display panel".

For example, the touch panel display 32 is a liquid crystal display panel with a touch panel, and displays software keys (emits display light) for receiving, from a user, various types of settings such as settings for job performance conditions. The hardware keys 33 include a start key and a numeric keypad.

With reference back to FIG. 1, the photovoltaic module 40 is attached through support members 50 to the reading housing 11. Alternatively, as a variation, the photovoltaic module 40 may be attached to the panel housing 31. The attachment structure of the photovoltaic module 40 will be described in detail later.

Figure 4:
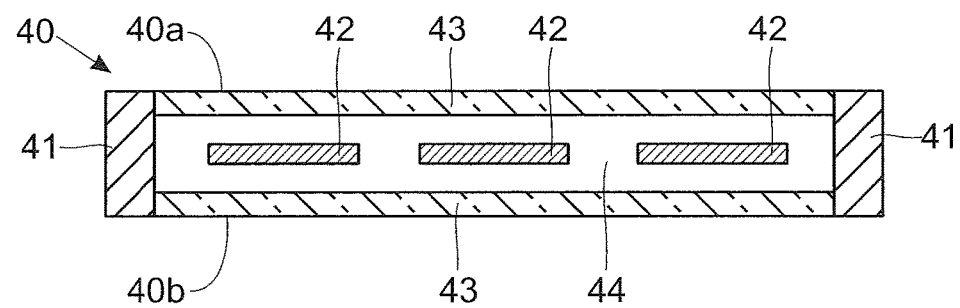
FIG. 4 is a cross-sectional view showing the configuration of a photovoltaic module which is fitted to the multifunctional machine according to the embodiment of the present disclosure.

As shown in FIG. 4, the photovoltaic module 40 includes a housing 41 (hereinafter referred to as the module hosing 41). The module hosing 41 is formed in the shape of a frame. Within the frame of the module hosing 41 (frame member), a plurality of solar cells 42 are stored which receive sunlight or artificial light (light such as fluorescent light) so as to generate electric power. For example, the solar cell 42 is a double-sided light receiving type in which both the front surface and the back surface function as light receiving surfaces.

On each of the front surface side and the back surface side of the photovoltaic module 40, a transparent plate 43 is provided, and the solar cells 42 are arranged between a pair of transparent plates 43. In a region between the pair of transparent plates 43, a region where the solar cells 42 are not arranged is filled with a transparent filler 44. The solar cells 42 convert, into electric power, light which enters from each of the surfaces of the pair of transparent plates 43 that are directed outward (receive light so as to generate electric power). In the following description, the outer surface of one of the transparent plates 43 is referred to as a first light receiving surface 40a, and the outer surface of the other transparent plate 43 is referred to as a second light receiving surface 40b.

Figure 5:
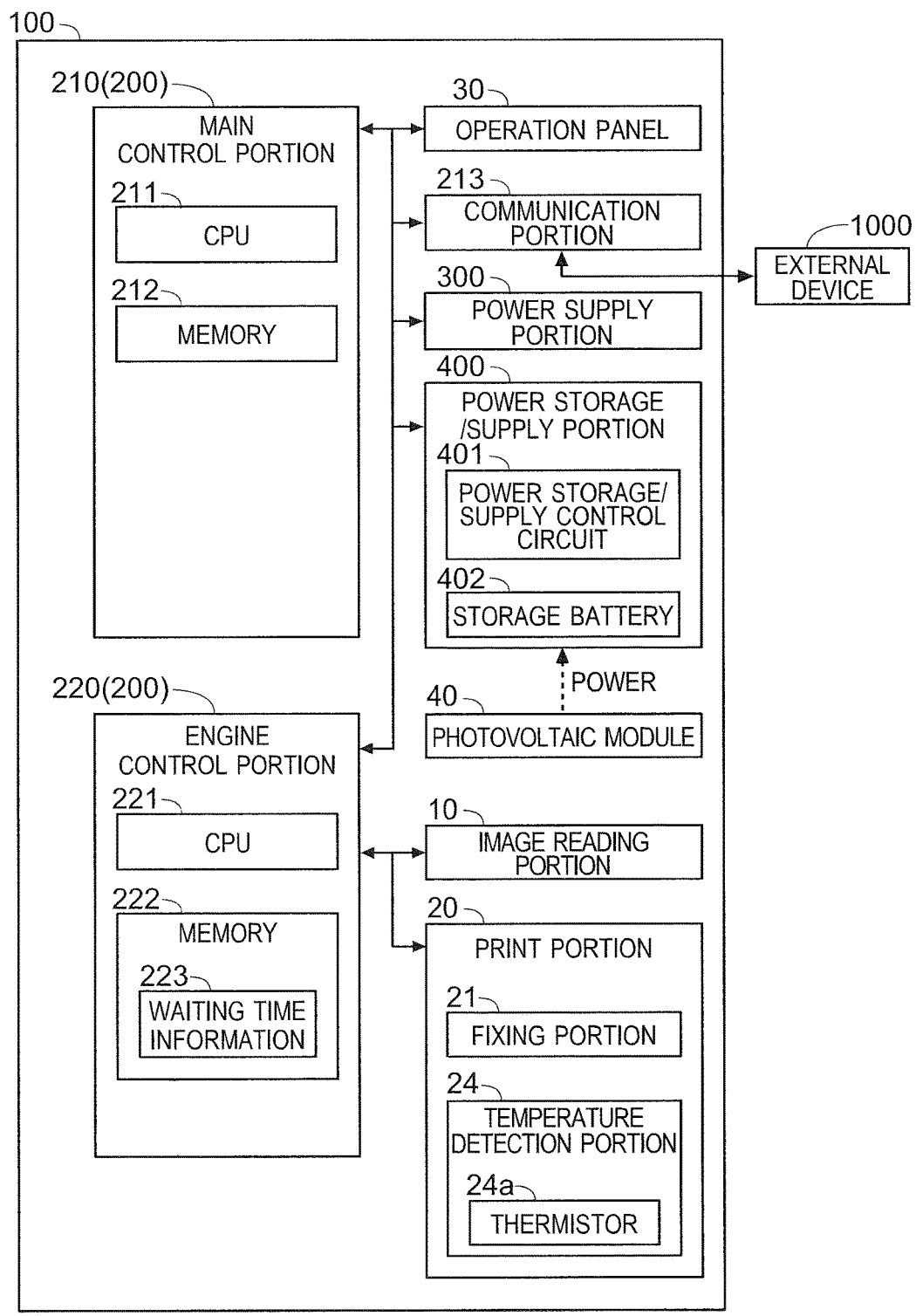
FIG. 5 is a diagram showing the hardware configuration of the multifunctional machine according to the embodiment of the present disclosure.

As shown in FIG. 5, the multifunctional machine 100 includes a control portion 200. Although in the following description, an example is used where the control portion 200 is divided into two portions which are a main control portion 210 and an engine control portion 220, the control portion 200 may not be divided into two portions.

The main control portion 210 includes a CPU 211 and a memory 212 (such as a ROM and a RAM). For example, the main control portion 210 performs overall control on the multifunctional machine 100. The main control portion 210 also controls the display operation of the operation panel 30 and detects an operation performed on the operation panel 30.

The main control portion 210 also communicates with an external device 1000 such as a personal computer (user terminal) through a communication portion 213. The communication portion 213 is a network interface for the network connection of the external device 1000 to the multifunctional machine 100.

The main control portion 210 performs reception detection on whether or not the communication portion 213 receives a communication request from the external device 1000. When the main control portion 210 detects that the communication portion 213 receives the communication request from the external device 1000, the main control portion 210 communicates with the external device 1000 through the communication portion 213. When in the communication, the communication portion 213 receives, from the external device 1000, job data on a print job (the data including the image data of an image to be printed, the job performance conditions when the job is performed and a job request for requesting the performance of the job), the main control portion 210 determines that the job request is received, and performs processing for performing the print job. For example, image processing on the image data included in the job data and processing for transferring, to the engine control portion 220, the image data on which the image processing has been performed are performed by the main control portion 210.

The engine control portion 220 includes a CPU 221 and a memory 222 (such as a ROM and a RAM). The engine control portion 220 controls the reading operation of the image reading portion 10. The engine control portion 220 also controls the printing operation of the print portion 20.

Here, the engine control portion 220 performs temperature control on the fixing portion 21 as the control on the printing operation. In order to perform the temperature control on the fixing portion 21, a temperature detection portion 24 is provided in the multifunctional machine 100.

The temperature detection portion 24 is a temperature sensor which outputs a voltage corresponding to the temperature of the fixing portion 21. For example, the temperature detection portion 24 is formed with a circuit which includes a thermistor 24a. The thermistor 24a is arranged in the vicinity of the fixing roller pair 22 (see FIG. 2), and changes its resistance value according to the temperature of the fixing roller pair 22. In other words, the output voltage value of the temperature detection portion 24 is changed according to the temperature of the fixing portion 21. The thermistor 24a may be in contact with the fixing roller pair 22 (the heating roller 22a) or may be in noncontact therewith.

The output of the temperature detection portion 24 is received by the engine control portion 220. Then, the engine control portion 220 detects the temperature of the fixing portion 21 based on the output of the temperature detection portion 24, and performs the temperature control on the fixing portion 21 based on the detected temperature. For example, the engine control portion 220 switches the turning on and off of power supply to the heater 23 and thereby increases the temperature of the fixing portion 21 to a predetermined temperature so as to keep the temperature of the fixing portion 21 at the predetermined temperature.

The multifunctional machine 100 also includes a power supply portion 300. The power supply portion 300 includes a power supply circuit for generating a voltage and a power supply control circuit for controlling power supply. The power supply portion 300 generates a voltage for operating the individual portions of the multifunctional machine 100 such as the image reading portion 10, the print portion 20, the operation panel 30, the main control portion 210 and the engine control portion 220. The power supply portion 300 receives an instruction from the main control portion 210 so as to switch power supply modes. The power supply modes will be described in detail later.

Here, the multifunctional machine 100 includes a power storage/supply portion 400. The power storage/supply portion 400 includes a power storage/supply control circuit 401 and a storage battery 402. The power storage/supply control circuit 401 controls the storage and supply of power output from the photovoltaic module 40. The storage battery 402 stores the power output from the photovoltaic module 40. The power storage/supply portion 400 receives an instruction from the main control portion 210 so as to control the supply of power to a predetermined power supply destination. For example, the power storage/supply portion 400 supplies power to the temperature detection portion 24.

<Normal Mode and Power Saving Mode>

The multifunctional machine 100 has, as the power supply modes, a normal mode and a power saving mode (sleep mode). The normal mode is a mode in which the power supply portion 300 performs normal power supply. The power saving mode is a mode in which the power supply performed by the power supply portion 300 is restricted as compared with the normal mode (the mode in which power consumption is reduced).

In the normal mode, the main control portion 210 determines whether or not a change condition which is previously determined as a condition for changing the multifunctional machine 100 from the normal mode to the power saving mode is satisfied. When the main control portion 210 determines that the change condition is satisfied, the main control portion 210 instructs the power supply portion 300 to change the multifunctional machine 100 from the normal mode to the power saving mode. For example, the main control portion 210 measures an unused time that is a time which elapses without use of the multifunctional machine 100, and when the unused time exceeds a predetermined threshold time, the main control portion 210 determines that the change condition is satisfied.

A hardware key 33 (power saving key) for receiving, from the user, an instruction to change from the normal mode to the power saving mode may be provided in the operation panel 30. In this case, when in the normal mode, the main control portion 210 detects an operation performed on the power saving key in the operation panel 30, the main control portion 210 determines that the change condition is satisfied.

In the normal mode, the power supply portion 300 performs the normal power supply on the image reading portion 10, and thus the image reading portion 10 is brought into a state where the image reading portion 10 can perform a job (the job involving the reading of the original document). In the normal mode, the power supply portion 300 performs the normal power supply on the print portion 20 including the fixing portion 21, and thus the print portion 20 is brought into a state where the print portion 20 can perform a job (the job involving the printing). On the other hand, in the power saving mode, the power supply portion 300 stops the power supply to the image reading portion 10 and the print portion 20. Hence, in the power saving mode, the image reading portion 10 and the print portion 20 are in a state where it is impossible to perform the job.

In the normal mode, the power supply portion 300 also performs the normal power supply to the operation panel 30. Here, in the operation panel 30, a screen is displayed, and thus an operation from the user is received. On the other hand, in the power saving mode, the power supply portion 300 restricts the power supplied to the operation panel 30 as compared with the normal mode (stops part of the power supply to the operation panel 30). For example, the power supply portion 300 stops the power supply to the liquid crystal display panel (backlight) of the touch panel display 32. Hence, in the power saving mode, the operation panel 30 stops the display of the screen, and receives, in such a state, an operation from the user.

Furthermore, in the normal mode, the power supply portion 300 performs the normal power supply to storage devices such as an HDD and an SSD which are not illustrated. On the other hand, in the power saving mode, the power supply portion 300 stops the power supply to the storage devices. The storage devices are used as, for example, a storage region for temporarily storing image data and the like. Another device in which in the normal mode, the power supply from the power supply portion 300 is received and in which in the power saving mode, the power supply from the power supply portion 300 is stopped may be provided in the multifunctional machine 100.

Here, in the normal mode, the main control portion 210 makes the power supply portion 300 perform the power supply to the temperature detection portion 24. Then, when the main control portion 210 changes the multifunctional machine 100 from the normal mode to the power saving mode, the main control portion 210 stops the power supply from the power supply portion 300 to the temperature detection portion 24 and starts the power supply from the power storage/supply portion 400 to the temperature detection portion 24.

<Return Processing By Control Portion>

In the power saving mode, an operation signal whose signal level is changed when the operation panel 30 is operated and a reception signal whose signal level is changed when the communication portion 213 receives the communication request from the external device 1000 are input to the main control portion 210. Hence, even in the power saving mode, the main control portion 210 can perform operation detection on whether or not an operation is performed on the operation panel 30 and the reception detection on whether or not the communication portion 213 receives the communication request from the external device 1000.

When in the power saving mode, the signal level of either of the operation signal and the reception signal is changed, the main control portion 210 determines that a return condition which is previously determined as a condition for returning the multifunctional machine 100 from the power saving mode to the normal mode is satisfied. When the main control portion 210 determines that the return condition is satisfied, the main control portion 210 transmits, to the engine control portion 220, a return notification indicating that the return condition is satisfied. In this way, the engine control portion 220 recognizes that the return condition is satisfied.

When the return condition is satisfied, the main control portion 210 and the engine control portion 220 perform predetermined return processing for returning the multifunctional machine 100 from the power saving mode to the normal mode. Although not particularly limited, the main control portion 210 performs, as the return processing, processing in which the power supply portion 300 is made to perform the normal power supply on the operation panel 30 and in which a predetermined initial screen is displayed on the operation panel 30. The main control portion 210 also performs, as the return processing, processing in which the power supply portion 300 is made to perform the normal power supply on the storage devices (such as the HDD and the SSD which are not illustrated) and in which the main control portion 210 communicates with the storage devices so as to recognize the storage devices. Processing other than the processing described here may be performed as the return processing by the main control portion 210.

After the engine control portion 220 receives the return notification, the engine control portion 220 performs, as the return processing, processing in which the power supply portion 300 is made to start the power supply to the image reading portion 10 and the print portion 20. The engine control portion 220 also performs, as the return processing, processing in which the power supply portion 300 is made to start the power supply to the temperature detection portion 24. Then, here, the engine control portion 220 stops the power supply from the power storage/supply portion 400 to the temperature detection portion 24. In other words, the power supply from the power storage/supply portion 400 to the temperature detection portion 24 is performed only when the power supply portion 300 stops the power supply to the temperature detection portion 24.

As the return processing which is performed by the engine control portion 220, there are also other types of processing. As an example, the engine control portion 220 performs, based on the output of a state detection sensor (unillustrated) for detecting the state of the multifunctional machine 100, processing which detects the state of the multifunctional machine 100. For example, in the multifunctional machine 100, a sensor for detecting whether a cover attached to the main body 100A is opened or closed, a sensor for detecting whether a cassette in which sheets stored in the main body 100A are set is fitted or removed and the like are provided as the state detection sensors. When the engine control portion 220 detects the state of the multifunctional machine 100, the engine control portion 220 transmits state information indicating the state of the multifunctional machine 100 to the main control portion 210. Then, the main control portion 210 recognizes the state of the multifunctional machine 100 based on the state information, and performs processing which stores the recognized state of the machine, processing which displays, on the operation panel 30 a message indicating the recognized state of the machine and the like.

<Fixing Return Processing By Engine Control Portion>

When the return condition is satisfied, the engine control portion 220 performs, as one type of processing in the return processing, fixing return processing which increases the temperature of the fixing portion 21 to a predetermined temperature. The fixing return processing will be specifically described below.

When the return condition is satisfied (when the return notification is received), the engine control portion 220 detects the temperature of the fixing portion 21 based on the output of the temperature detection portion 24. In the following description, the temperature of the fixing portion 21 which is detected when the return condition is satisfied is referred to as a temperature on return.

When the return condition is satisfied, the power supply from the power supply portion 300 to the temperature detection portion 24 has not been performed yet. However, here, the power storage/supply portion 400 performs the power supply to the temperature detection portion 24. Hence, when the return condition is satisfied, the engine control portion 220 can immediately detect the temperature of the fixing portion 21 (the temperature on return).

After the engine control portion 220 detects the temperature on return, the engine control portion 220 sets, based on the temperature on return, the timing at which the fixing return processing is started. Here, as the temperature on return is higher, the engine control portion 220 starts the fixing return processing at later timing whereas as the temperature on return is lower, the engine control portion 220 starts the fixing return processing at earlier timing.

Figure 6:
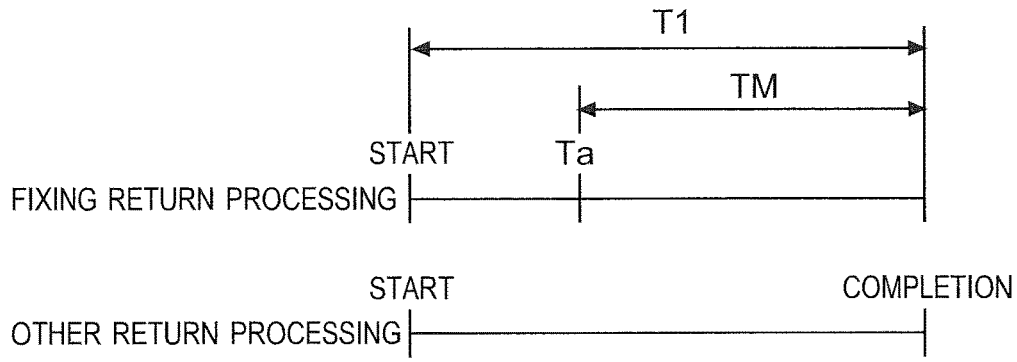
FIG. 6 is a diagram for illustrating timing at which fixing return processing performed in the multifunctional machine according to the embodiment of the present disclosure is started.

For example, when the temperature on return is high, as compared with a case where the temperature on return is low, the time until the temperature of the fixing portion 21 reaches the predetermined temperature is short. Hence, when the temperature on return is high, the fixing return processing is started with timing at which the return condition is satisfied (with timing at which the return notification from the main control portion 210 is received by the engine control portion 220), and thus as shown in FIG. 6, the temperature of the fixing portion 21 may reach the predetermined temperature earlier than the timing at which the other types of processing other than the fixing return processing in the return processing are completed (the time at which the temperature of the fixing portion 21 reaches the predetermined temperature is represented by "Ta"). In this case, after the temperature of the fixing portion 21 reaches the predetermined temperature, temperature maintenance processing which keeps the temperature of the fixing portion 21 at the predetermined temperature needs to be performed as one type of processing in the fixing return processing (a period during which the temperature maintenance processing is performed is represented by "TM"). In other words, in an example shown in FIG. 6, the processing time of the fixing return processing is T1.

Figure 7:
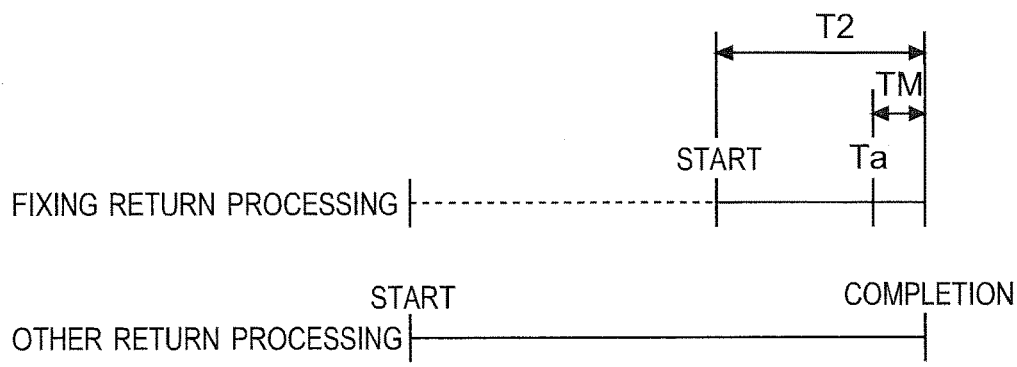
FIG. 7 is a diagram for illustrating timing at which the fixing return processing performed in the multifunctional machine according to the embodiment of the present disclosure is started.

On the other hand, when the temperature on return is high, the fixing return processing is started at later timing than the timing at which the return condition is satisfied, and thus as shown in FIG. 7, the processing time of the temperature maintenance processing is shortened or the temperature maintenance processing does not need to be performed. In this case, the processing time of the fixing return processing is T2, and thus the power consumption is reduced.

Hence, as the temperature on return is higher, the engine control portion 220 starts the fixing return processing at later timing. When the temperature on return is low, since it takes much time for the temperature of the fixing portion 21 to reach the predetermined temperature, the fixing return processing is preferably started at earlier timing. Hence, as the temperature on return is lower, the engine control portion 220 starts the fixing return processing at earlier timing.

Figure 8:
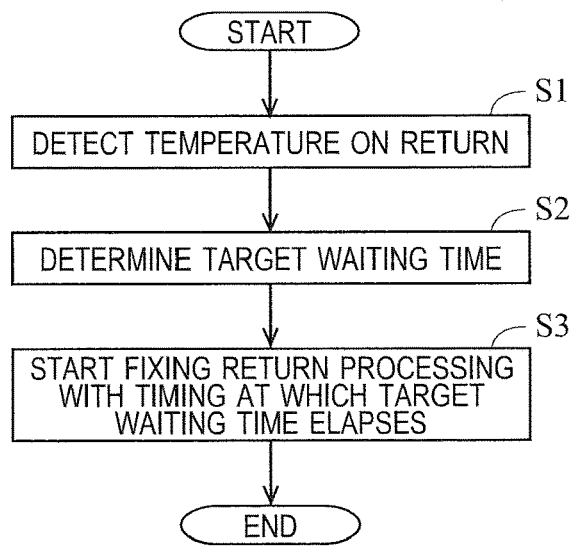
FIG. 8 is a flowchart showing the flow of the fixing return processing performed in the multifunctional machine according to the embodiment of the present disclosure.

The flow of the fixing return processing by the engine control portion 220 will be described below with reference to a flowchart shown in FIG. 8. The start of the flowchart shown in FIG. 8 is the time at which the return condition is satisfied (the time at which the return notification from the main control portion 210 is received by the engine control portion 220).

In step S1, the engine control portion 220 detects, based on the output of the temperature detection portion 24, the temperature of the fixing portion 21 (the temperature on return). In step S2, the engine control portion 220 determines, based on waiting time information 223 (see FIG. 5) stored in the memory 222, a waiting time corresponding to the temperature on return. Hereinafter, the waiting time determined by the engine control portion 220 is referred to as a target waiting time.

Here, the waiting time information 223 is information in which a waiting time after the return condition is satisfied until the fixing return processing is started is previously determined and in which the waiting time corresponding to the temperature of the fixing portion 21 is previously determined such that as the temperature of the fixing portion 21 is increased, the waiting time is increased. Although not particularly limited, in the waiting time information 223, the maximum temperature and the minimum temperature of the fixing portion 21 in the power saving mode are previously determined, the range from the maximum temperature to the minimum temperature is divided into a plurality of temperature ranges and a plurality of waiting times which respectively correspond to a plurality of temperature ranges are defined such that as the temperature of the fixing portion 21 is increased, the waiting time is increased.

Each of the waiting times defined in the waiting time information 223 is determined such that the timing at which the temperature of the fixing portion 21 reaches the predetermined temperature substantially coincides with the timing at which all the other types of processing other than the fixing return processing in the return processing are completed. However, when a heating time which is needed until the temperature of the fixing portion 21 reaches the predetermined temperature is long with respect to a scheduled time which is needed until all the other types of processing other than the fixing return processing in the return processing are completed, the waiting time is "0".

After the engine control portion 220 determines the target waiting time, the process proceeds to step S3. When the process proceeds to step S3, the engine control portion 220 starts the fixing return processing with timing at which the target waiting time elapses after the return condition is satisfied. In this way, as the temperature on return is higher, the fixing return processing is started at later timing whereas as the temperature on return is lower, the fixing return processing is started at earlier timing.

<Attachment Structure of Photovoltaic Module>

Figure 9:
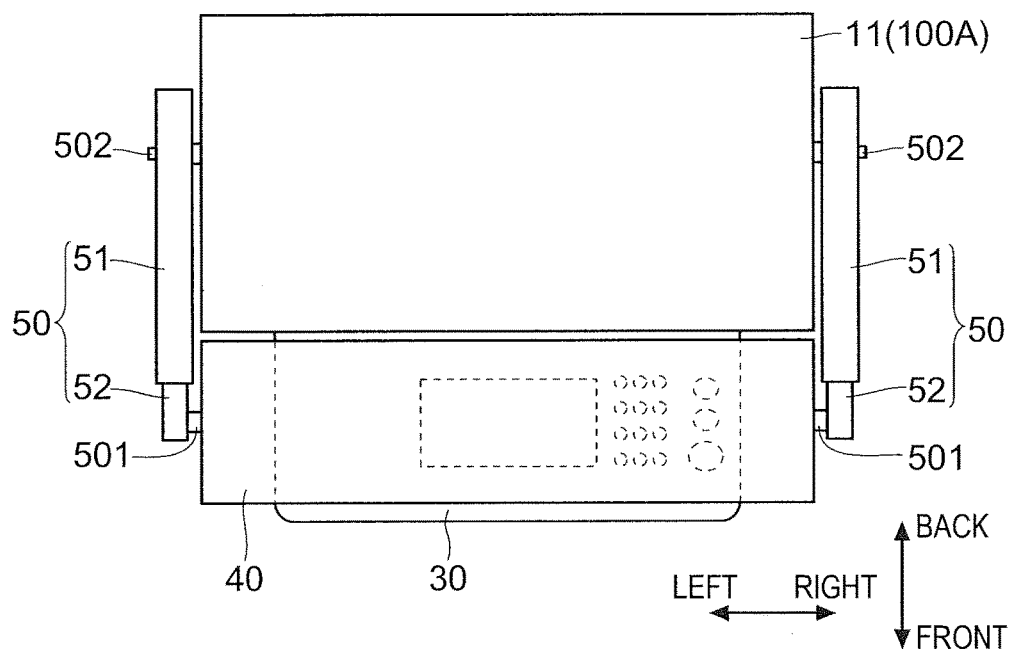
FIG. 9 is a diagram when the multifunctional machine according to the embodiment of the present disclosure is seen from above.
Figure 10:
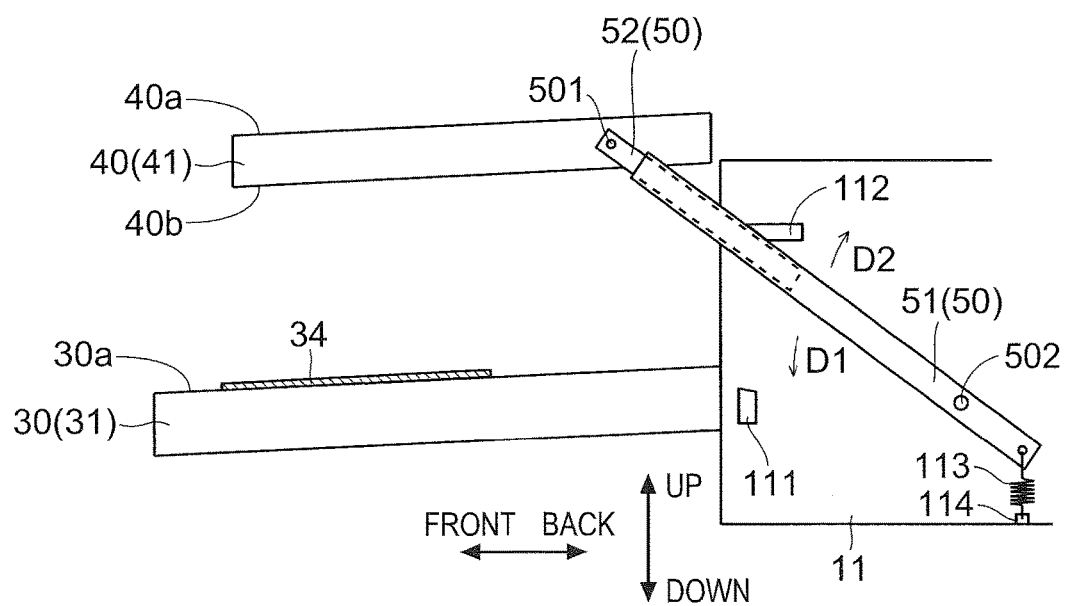
FIG. 10 is a diagram when the surrounding parts of support members attached to the multifunctional machine according to the embodiment of the present disclosure are seen laterally (the diagram when the support members are present in an upper limit position)

As shown in FIGS. 9 and 10, the support members 50 support the photovoltaic module 40 such that the photovoltaic module 40 is arranged above the operation surface 30a of the operation panel 30. Specifically, the support member 50 is formed so as to be extended linearly, and is arranged on each of the left side surface and the right side surface of the reading housing 11. The photovoltaic module 40 is attached to one end portion of the support member 50 in the direction of extension thereof, and the other end portion on the side opposite to the one end portion of the support member 50 is attached to the side surface of the reading housing 11 (the main body 100A).

Figure 11:
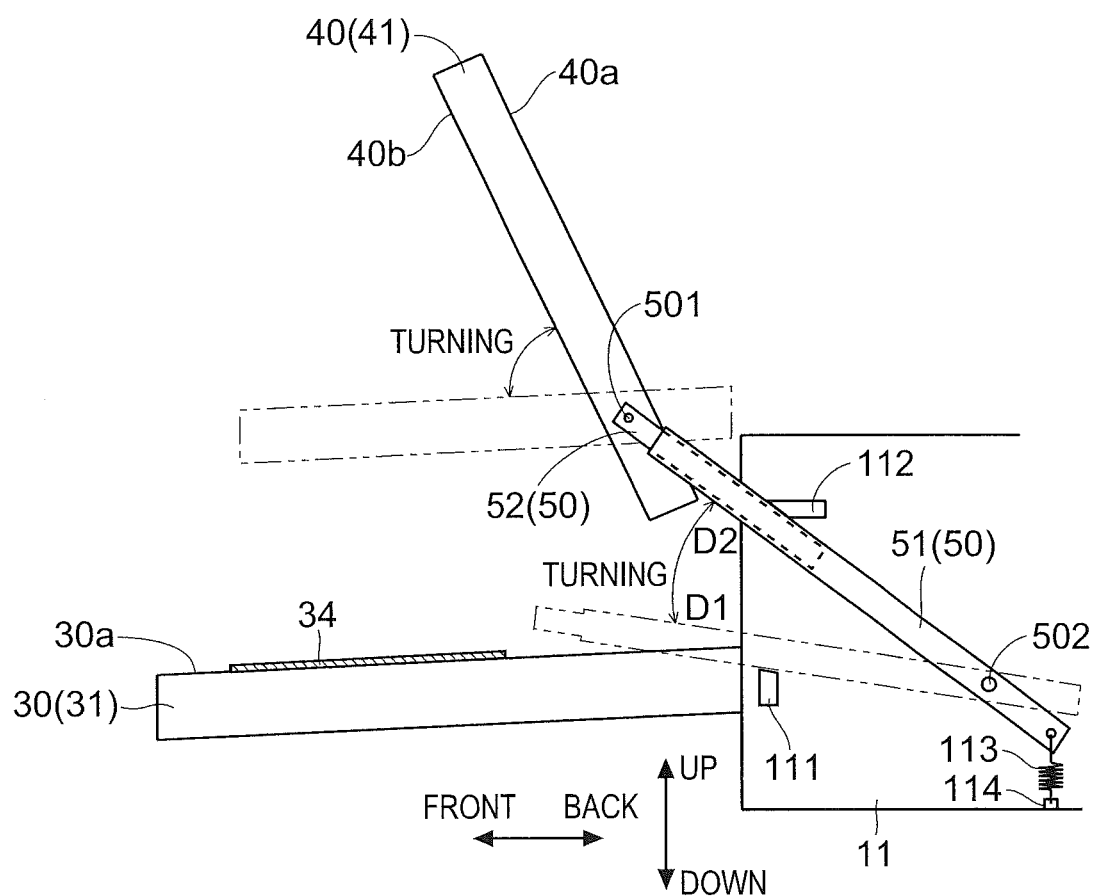
FIG. 11 is a diagram when the surrounding parts of the support members attached to the multifunctional machine according to the embodiment of the present disclosure are seen laterally (the diagram when a photovoltaic module is turned upward with respect to the support members)

Here, a turning shaft 501 is provided at the one end portions of the support members 50, and the module hosing 41 is coupled to the turning shaft 501, with the result that the photovoltaic module 40 is attached to the support members 50. In this way, as shown in FIG. 11, the photovoltaic module 40 is turned with respect to the support members 50 with the turning shaft 501 serving as a pivot. Although not particularly limited, as the turning shaft 501, a torque hinge shaft is used. Hence, the photovoltaic module 40 is prevented from being turned by its weight (the photovoltaic module 40 can be held at an arbitrary inclination angle).

When the photovoltaic module 40 is endlessly rotated with respect to the support members 50, an electrical wire 46 (see FIG. 16) which is extended from the photovoltaic module 40 is twisted. Hence, the upper surface (the surface which needs to be directed upward) and the lower surface (the surface which needs to be directed downward) of the photovoltaic module 40 are previously determined. Although not illustrated, a regulation member for regulating the range of turning of the photovoltaic module 40 is provided in the support member 50 such that the upper surface of the photovoltaic module 40 is prevented from being directed downward (in other words, the lower surface of the photovoltaic module 40 is prevented from being directed upward). In the following description, among the individual surfaces of the photovoltaic module 40, a first light receiving surface 40a is assumed to be the upper surface, and a second light receiving surface 40b is assumed to be the lower surface.

<Turning and Extension and Contraction of Support Member>

Figure 12:
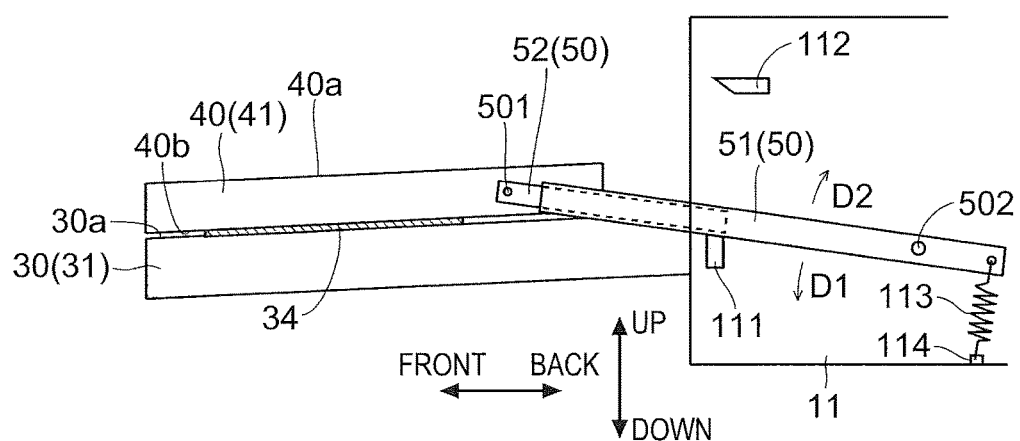
FIG. 12 is a diagram when the surrounding parts of the support members attached to the multifunctional machine according to the embodiment of the present disclosure are seen laterally (the diagram when the support members are present in a lower limit position)

As shown in FIGS. 10 to 12, a turning shaft 502 is provided at the other end portions of the support members 50 (the end portions on the side opposite to the end portions to which the photovoltaic module 40 is attached). The turning shaft 502 is supported by a support portion (unillustrated) provided on the side surface of the reading housing 11 such that the turning shaft 502 can be turned. Hence, the support members 50 are turned with the turning shaft 502 serving as a pivot such that the one end portions (the end portions to which the photovoltaic module 40 is attached) are shaken in an up/down direction.

When the support members 50 are turned, the photovoltaic module 40 attached to the support members 50 is moved in the up/down direction. When the support members 50 are turned in a direction D1 such that the photovoltaic module 40 is moved downward, the photovoltaic module 40 approaches the operation panel 30. On the other hand, when the support members 50 are turned in a direction D2 such that the photovoltaic module 40 is moved upward, the photovoltaic module 40 is moved away from the operation panel 30.

For example, on the side surface of the reading housing 11, a lower limit stopper 111 for stopping the turning of the support members 50 in the direction D1 and an upper limit stopper 112 for stopping the turning of the support members 50 in the direction D2 are provided. Although not particularly limited, each of the lower limit stopper 111 and the upper limit stopper 112 is formed of an elastic material such as rubber.

In this way, after the support member 50 makes contact with the lower limit stopper 111, the support members 50 cannot be turned in the direction D1 (see FIG. 12). On the other hand, after the support member 50 makes contact with the upper limit stopper 112, the support members 50 cannot be turned in the direction D2 (see FIGS. 10 and 11). Hence, the position of the support members 50 when the support member 50 makes contact with the lower limit stopper 111 is a lower limit position (which corresponds to a "first position"), and the position of the support members 50 when the support member 50 makes contact with the upper limit stopper 112 is an upper limit position (which corresponds to a "second position"). In other words, the support members 50 are turned between the lower limit position and the upper limit position.

Figure 13:
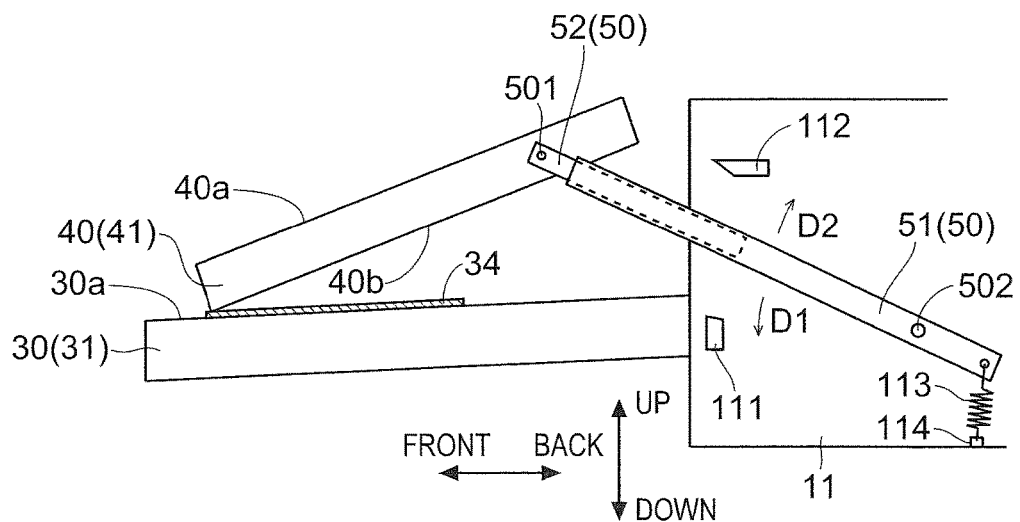
FIG. 13 is a diagram when the surrounding parts of the support members attached to the multifunctional machine according to the embodiment of the present disclosure are seen laterally (the diagram when the support members are turned)

The support members 50 which are present in the upper limit position are turned in the direction D1, and thus as shown in FIG. 13, the photovoltaic module 40 is moved downward so as to make contact with the operation panel 30. For example, on the operation surface 30a of the operation panel 30, a cushion member 34 formed of rubber or the like is provided in order to reduce an impact produced when the photovoltaic module 40 makes contact therewith. Then, after the photovoltaic module 40 makes contact with the cushion member 34, the support members 50 are further continuously turned in the direction D1, and thus the support members 50 reach the lower limit position so as to be brought into a state shown in FIG. 12.

Then, when the support members 50 reach the lower limit position, the operation surface 30a of the operation panel 30 is blocked (covered) by the photovoltaic module 40. Here, the first light receiving surface 40a (upper surface) of the photovoltaic module 40 is directed in a direction opposite to a direction opposite the operation surface 30a of the operation panel 30. The second light receiving surface 40b (lower surface) of the photovoltaic module 40 is opposite the operation surface 30a of the operation panel 30.

When the photovoltaic module 40 is arranged in such a position as to block the operation surface 30a of the operation panel 30, since the first light receiving surface 40a of the photovoltaic module 40 is directed upward, light such as sunlight or artificial light enters the first light receiving surface 40a, with the result that electric power is generated by utilization of the light in the photovoltaic module 40. Furthermore, when in a state where the photovoltaic module 40 is arranged in such a position as to block the operation surface 30a of the operation panel 30, the operation panel 30 performs the display operation (when the operation panel 30 emits display light), the display light of the operation panel 30 enters the second light receiving surface 40b of the photovoltaic module 40. Hence, electric power is generated by utilization of the display light of the operation panel 30 in the photovoltaic module 40.

On the other hand, when the support members 50 are turned in the direction D2 so as to reach the upper limit position, the support members 50 are brought into a state shown in FIGS. 10 and 11. In other words, when the support members 50 are present in the upper limit position, the photovoltaic module 40 exposes the operation surface 30a of the operation panel 30. Here, the photovoltaic module 40 can be arbitrarily turned with respect to the support members 50 (see FIG. 11). Hence, the inclination angle of the photovoltaic module 40 can be arbitrarily changed.

Here, the support members 50 are constantly biased by a biasing member 113 such as a tension spring so as to be turned from the lower limit position to the upper limit position. For example, when a tension spring is used as the biasing member 113, one end of the tension spring is attached to the support member 50, and the other end of the tension spring is attached to a spring post 114 which is protruded from the reading housing 11.

Figure 14:
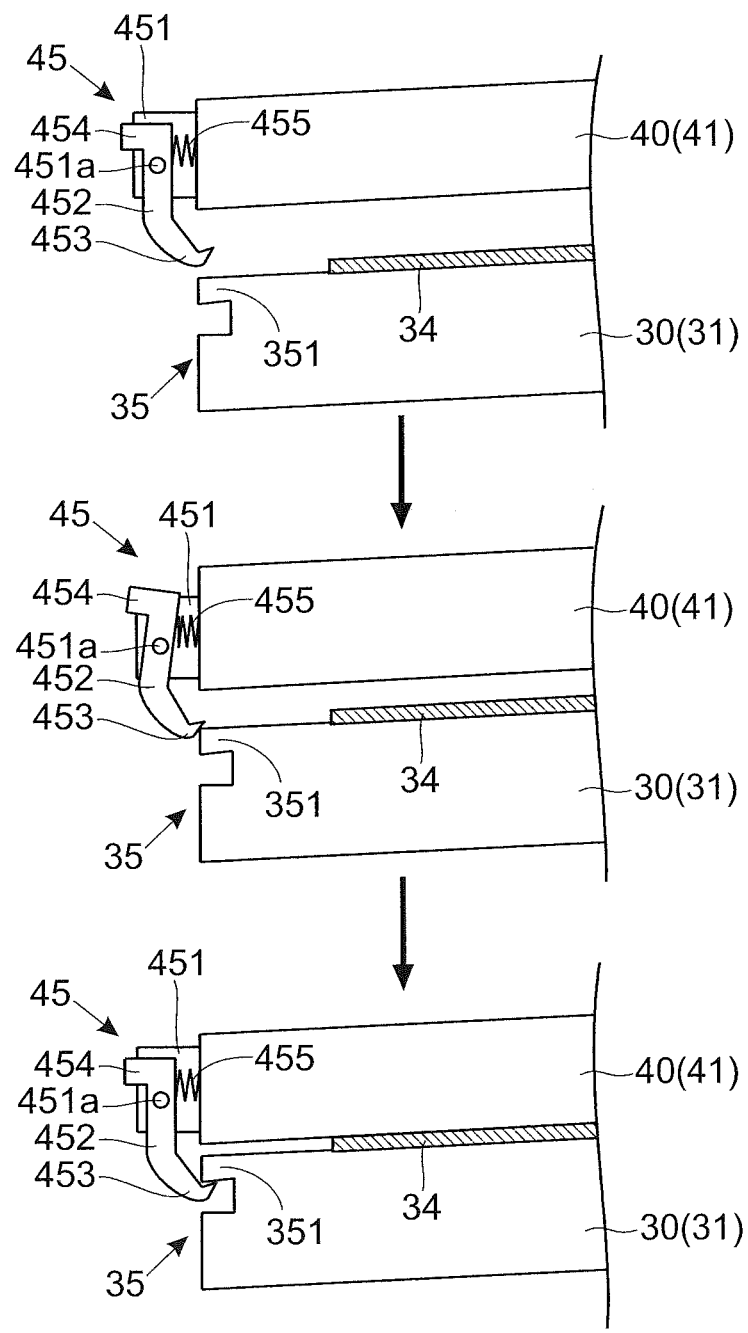
FIG. 14 is a diagram showing the structures of the individual engagement portions of the photovoltaic module and the operation panel fitted to the multifunctional machine according to the embodiment of the present disclosure.

As shown in FIG. 14, in the photovoltaic module 40 and the operation panel 30, a module-side engagement portion 45 and a panel-side engagement portion 35 are respectively provided. The module-side engagement portion 45 and the panel-side engagement portion 35 respectively correspond to a "first engagement portion" and a "second engagement portion".

The module-side engagement portion 45 includes an actuator 452 which is attached to a holder 451 so as to be able to be turned. The actuator 452 is turned with a turning shaft 451a provided in the holder 451 serving as a pivot. One end 453 of the actuator 452 is formed in the shape of a claw so as to function as an engagement piece (hereinafter referred to as the engagement piece 453). The other end 454 of the actuator 453 is biased by a biasing member 455 such as a compression spring. The panel-side engagement portion 35 includes an engagement protrusion 351 which is formed so as to be able to be engaged with the engagement piece 453.

Then, the module-side engagement portion 45 and the panel-side engagement portion 35 are turned until the support members 50 reach the lower limit position so as to be engaged with each other. A specific description will be given below.

First, in a state (the state of the upper diagram of FIG. 14) where the photovoltaic module 40 is separate from the operation panel 30, the support members 50 are turned, and thus the photovoltaic module 40 is moved downward, with the result that the engagement piece 453 makes contact with the engagement protrusion 351. In this state, the photovoltaic module 40 is further continuously moved downward, and thus the actuator 452 is turned against the biasing force of the biasing member 455. Thereafter, the photovoltaic module 40 is continuously moved downward until the support members 50 reach the lower limit position, and thus the engagement piece 453 enters below the engagement protrusion 351, with the result that the engagement piece 453 and the engagement protrusion 351 are engaged with each other (the state of the lower diagram of FIG. 14).

Hence, when the support members 50 are present in the lower limit position (when the support members 50 are in the state shown in FIG. 12), the module-side engagement portion 45 and the panel-side engagement portion 35 are engaged with each other, and thus the support members 50 are prevented from being turned toward the upper limit position by the biasing force of the biasing member 113. In other words, the photovoltaic module 40 is prevented from being moved upward (the photovoltaic module 40 is held in such a position as to block the operation surface 30a of the operation panel 30).

The engagement of the module-side engagement portion 45 and the panel-side engagement portion 35 is released by pushing inward the other end 454 of the actuator 452 against the biasing force of the biasing member 455. When the engagement of the module-side engagement portion 45 and the panel-side engagement portion 35 is released, the support members 50 are turned by the biasing force of the biasing member 113 from the lower limit position to the upper limit position.

In this way, when the support members 50 are present in the lower limit position, the other end 454 of the actuator 452 is only pushed, and thus the support members 50 can be rotated from the lower limit position to the upper limit position. In other words, the operation surface 30a of the operation panel 30 can be exposed (which makes it possible to perform an operation on the operation panel 30). When the configuration described above is adopted, as the upper limit stopper 112, a dumper or the like may be used in order to reduce an impact produced when the support members 50 collide with the upper limit stopper 112.

The photovoltaic module 40 can be moved not only in the up/down direction but also in the direction of extension of the support members 50. In other words, the support members 50 can be extended and contracted in the direction of extension thereof.

Figure 15:
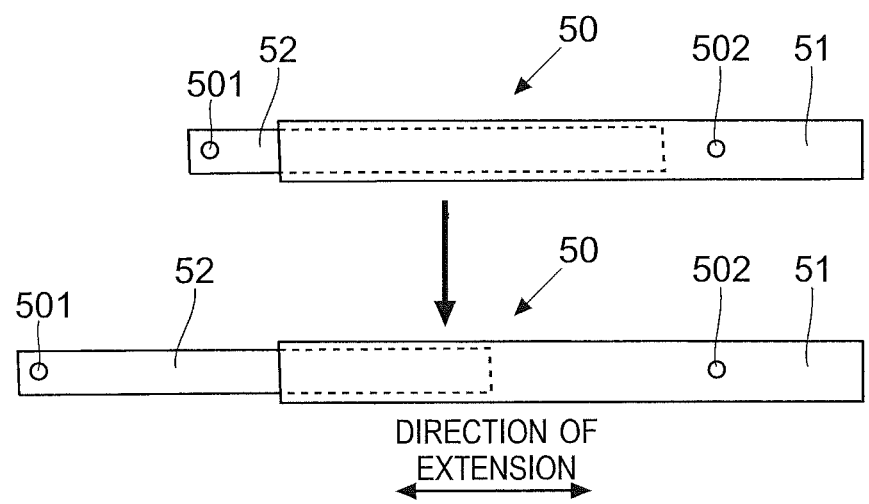
FIG. 15 is a diagram showing the structure of the support member attached to the multifunctional machine according to the embodiment of the present disclosure.
Figure 16:
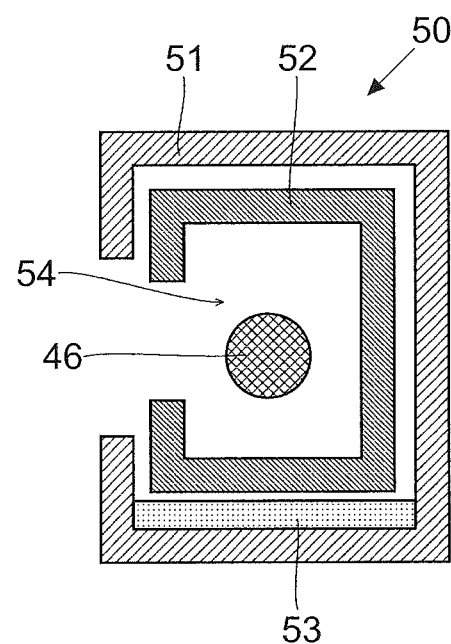
FIG. 16 is a cross-sectional view of the support member attached to the multifunctional machine according to the embodiment of the present disclosure.

For example, as shown in FIGS. 15 and 16, the support member 50 includes a rail member 51 and a slide member 52. The rail member 51 is a member which is attached to the reading housing 11 and which includes the turning shaft 502 supported by the reading housing 11. The slide member 52 is supported by the rail member 51 so as to be able to slide with respect to the rail member 51, and slides with respect to the rail member 51 (the support member 50 is extended and contracted in the direction of extension thereof). Then, the photovoltaic module 40 is coupled through the turning shaft 501 to the slide member 52.

Although not particularly limited, the rail member 51 is formed such that its cross section is formed substantially in the shape of the letter U (the ring shape which partially has a slit). In other words, the rail member 51 has a space therewithin. The slide member 52 is inserted into the inside of the rail member 51. In this way, the slide member 52 can slide in the direction of extension thereof while being guided to the inside surface of the rail member 51. For example, on the inner bottom surface of the rail member 51, an anti-slip friction sheet 53 formed of rubber or the like is arranged. The friction sheet 53 makes contact with the slide member 52, and thus it is possible to reduce the sliding down of the slide member 52 by its weight.

As with the rail member 51, the slide member 52 is formed such that its cross section is formed substantially in the shape of the letter U. The space within the support member 50 is used as a storage space 54 for storing the electrical wire 46 extended from the photovoltaic module 40. For example, the electrical wire 46 is inserted from the slit formed in the support member 50 into the inside of the support member 50, and thus the electrical wire 46 can be stored in the storage space 54.

As described above, the multifunctional machine 100 of the present embodiment includes: the fixing portion 21 that includes the fixing roller pair (fixing member) 22 which receives power supply so as to increase in temperature and that fixes the toner image transferred to the sheet P to the sheet P with the fixing roller pair 22 whose temperature is increased to a predetermined temperature; the temperature detection portion 24 that receives power supply so as to output a voltage corresponding to the temperature of the fixing portion 21; the power supply portion 300 that performs the power supply to the fixing portion 21 and the temperature detection portion 24 in the normal mode and that stops the power supply to the fixing portion 21 and the temperature detection portion 24 in the power saving mode; the engine control portion 220 (control portion) that detects, based on the output of the temperature detection portion 24, the temperature of the fixing portion 21 so as to perform temperature control on the fixing portion 21 and that returns the multifunctional machine 100 to the normal mode by performing the predetermined return processing including the fixing return processing in which when the return condition is satisfied, the temperature of the fixing portion 21 is increased to the predetermined temperature; the photovoltaic module 40 that receives light so as to generate electric power; and the power storage/supply portion 400 that stores the power output from the photovoltaic module 40 and that performs power supply to the temperature detection portion 24 when the power supply from the power supply portion 300 to the temperature detection portion 24 is stopped. Furthermore, in the memory 222 (storage portion) of the engine control portion 220, the waiting time information 223 is stored in which the waiting time after the return condition is satisfied until the fixing return processing is started is previously determined and in which the waiting time corresponding to the temperature of the fixing portion 21 is previously determined such that as the temperature of the fixing portion 21 is increased, the waiting time is increased.

The engine control portion 220 detects, when the return condition is satisfied, the temperature (the temperature on return) of the fixing portion 21 based on the output of the temperature detection portion 24. The engine control portion 220 determines, based on the waiting time information 223, as the target waiting time, the waiting time corresponding to the temperature on return. Then, the engine control portion 220 starts the fixing return processing with timing at which the target waiting time elapses after the return condition is satisfied. In other words, as the temperature on return is higher, the engine control portion 220 starts the fixing return processing at later timing whereas as the temperature on return is lower, the engine control portion 220 starts the fixing return processing at earlier timing.

In the configuration of the present embodiment, when the return condition is satisfied, as the temperature on return detected by the engine control portion 220 is higher (as the time which is needed to increase the temperature of the fixing portion 21 to the predetermined temperature is shortened), the fixing return processing is started at later timing, with the result that with respect to the timing at which the other types of processing other than the fixing return processing in the return processing are completed, it is possible to reduce the degree in which the temperature of the fixing portion 21 reaches the predetermined temperature at excessively early timing (it is possible to reduce a time difference between the timings). Here, when the temperature of the fixing portion 21 reaches the predetermined temperature, and the other types of processing are not completed, it is necessary to additionally perform, as the fixing return processing, the temperature maintenance processing which keeps the temperature of the fixing portion 21 at the predetermined temperature. However, when the time difference can be reduced, the processing time of the temperature maintenance processing is shortened. In this way, the processing time of the fixing return processing including the temperature maintenance processing is shortened, and thus it is possible to reduce power used in the fixing return processing.

In this configuration, when the return condition is satisfied (when the mode is the power saving mode), though the power supply from the power supply portion 300 to the temperature detection portion 24 is stopped, power is supplied from the power storage/supply portion 400 to the temperature detection portion 24. Hence, when the return condition is satisfied, the engine control portion 220 can immediately detect the temperature of the fixing portion 21 (detect the temperature on return), and thereby can determine whether the fixing return processing is started at later timing or at earlier timing.

As described above, the multifunctional machine 100 of the present embodiment includes: the operation panel 30 that includes the operation surface 30a which receives an operation from the user; and the support member 50 that supports the photovoltaic module 40 such that the photovoltaic module 40 is arranged above the operation surface 30a of the operation panel 30. The photovoltaic module 40 is supported by the support member 50 so as to be able to be turned with respect to the support member 50.

In the configuration in which the photovoltaic module 40 is supported by the support member 50 so as to be able to be turned with respect to the support member 50, the photovoltaic module 40 is turned with respect to the support member 50 according to the direction in which light enters (the inclination of the photovoltaic module 40 is adjusted), and thus it is possible to interrupt the light with the photovoltaic module 40 such that the light is prevented from being reflected off the operation surface 30a of the operation panel 30. Hence, since the photovoltaic module 40 also serves as a light shielding member, even when the light shielding member is not additionally provided, it is possible to reduce the occurrence of the inconvenience in which it is difficult to see the operation surface 30a of the operation panel 30 as a result of the reflection of the light off the operation surface 30a of the operation panel 30. In particular, when the multifunctional machine 100 is installed in a sunny place near a window in order to increase the amount of electric power generated in the photovoltaic module 40, since not only artificial light (light such as fluorescent light) but also sunlight enters the operation surface 30a of the operation panel 30, it is more difficult to see the operation surface 30a of the operation panel 30. However, in the configuration of the present embodiment, the inclination of the photovoltaic module 40 is adjusted such that the sunlight entering the operation surface 30a of the operation panel 30 from the window is interrupted, and thus it is possible to increase the amount of electric power generated in the photovoltaic module 40 and to also prevent the inconvenience in which it is difficult to see the operation surface 30a of the operation panel 30 as a result of the reflection of the sunlight off the operation surface 30a of the operation panel 30.

When the photovoltaic module 40 is arranged above the operation surface 30a of the operation panel 30, depending on the user, it is difficult to see the operation surface 30a of the operation panel 30. However, since the photovoltaic module 40 is supported by the support member 50 so as to be able to be turned with respect to the support member 50, it is possible to adjust the inclination of the photovoltaic module 40 so as to easily see the operation surface 30a of the operation panel 30.

In the present embodiment, as described above, the support member 50 is turned toward the lower limit position such that the photovoltaic module 40 is moved in a direction in which the photovoltaic module 40 approaches the operation surface 30a of the operation panel 30, when the support member 50 reaches the lower limit position, the photovoltaic module 40 blocks the operation surface 30a of the operation panel 30 and the support member 50 is turned from the lower limit position toward the upper limit position such that the photovoltaic module 40 is moved in a direction in which the photovoltaic module 40 is moved away from the operation surface 30a of the operation panel 30. In this configuration, for example, when the multifunctional machine 100 is not used, the support member 50 is held in the lower limit position, and thus the operation surface 30a of the operation panel 30 is blocked by the photovoltaic module 40, with the result that it is possible to reduce the adherence of dust to the operation surface 30a of the operation panel 30. In other words, it is not necessary to additionally provide a dedicated cover for reducing the adherence of dust to the operation surface 30a of the operation panel 30 (it is possible to reduce the adherence of dust to the operation surface 30a of the operation panel 30 without increasing the number of components). Preferably, when an operation is performed on the operation panel 30, the photovoltaic module 40 is turned from the lower limit position toward the upper limit position, and thus the photovoltaic module 40 is separated from the operation surface 30a of the operation panel 30, with the result that the operation surface 30a of the operation panel 30 is exposed.

In the present embodiment, as described above, the touch panel display 32 which emits the display light is arranged on the operation surface 30a of the operation panel 30. In the photovoltaic module 40, both the front surface and the back surface function as light receiving surfaces. In this configuration, when the second light receiving surface 40b of the photovoltaic module 40 is opposite the operation surface 30a of the operation panel 30, the display light emitted by the touch panel display 32 can be utilized for the generation of electric power by the photovoltaic module 40.

In the present embodiment, as described above, the support member 50 is biased by the biasing force of the biasing member 113 so as to be turned from the lower limit position to the upper limit position. In the photovoltaic module 40, the module-side engagement portion 45 is provided, and in the operation panel 30, the panel-side engagement portion 35 which can be engaged with the module-side engagement portion 45 is provided. The module-side engagement portion 45 and the panel-side engagement portion 35 are engaged with each other when the support member 50 is present in the lower limit position. In this configuration, when the operation surface 30a of the operation panel 30 is blocked by the photovoltaic module 40, the engagement of the module-side engagement portion 45 and the panel-side engagement portion 35 is released, and thus the operation panel 30 is moved upward (the support member 50 is turned from the lower limit position toward the upper limit position), with the result that the operation surface 30a of the operation panel 30 is exposed. In this way, it is possible to bring the state where the operation surface 30a of the operation panel 30 is blocked by the photovoltaic module 40 into the state where an operation can be performed on the operation panel 30 by one touch.

In the present embodiment, as described above, the support member 50 includes the rail member 51 and the slide member 52 which is supported by the rail member 51 so as to be able to slide on the rail member 51. The photovoltaic module 40 is supported by the slide member 52. In this configuration, it is possible not only to adjust the inclination of the photovoltaic module 40 but also to adjust the position of the photovoltaic module 40 in the forward and backward direction thereof (the direction of extension of the support member 50).

In the present embodiment, as described above, the support member 50 is formed such that the storage space 54 is acquired therewithin, and the electric wire 46 which is extended from the photovoltaic module 40 is stored in the storage space 54. In this configuration, even when the photovoltaic module 40 is arranged in a position away from the main body 100A (above the operation surface 30a of the operation panel 30), it is possible to reduce the exposure of the electrical wire 46.

The embodiment disclosed herein should be considered to be illustrative in all respects and not restrictive. The scope of the present disclosure is indicated not by the description of the above embodiment but by the scope of claims, and furthermore, meanings equivalent to the scope of claims and all modifications within the scope are included.

For example, a configuration may be adopted in which a motor for turning the support member 50 is provided in the multifunctional machine 100, in which the drive of the motor is controlled by the main control portion 210 and in which thus the support member 50 is turned (the photovoltaic module 40 may be moved in the up/down direction).

In a case where this configuration is adopted, when the power supply mode of the multifunctional machine 100 is changed from the normal mode to the power saving mode (sleep mode), the support member 50 may be turned to the lower limit position such that the operation surface 30a of the operation panel 30 is blocked by the photovoltaic module 40.

What is claimed is:

1. An image forming apparatus that has a normal mode and a power saving mode in which power consumption is reduced as compared with the normal mode and that returns to the normal mode when a predetermined return condition is satisfied in the power saving mode, the image forming apparatus comprising:
    a fixing portion that includes a fixing member which receives power supply so as to increase in temperature and that fixes an image printed on a sheet to the sheet with the fixing member whose temperature is increased to a predetermined temperature;
    a temperature detection portion that receives power supply so as to output a voltage corresponding to a temperature of the fixing portion;
    a power supply portion that performs the power supply to the fixing portion and the temperature detection portion in the normal mode and that stops the power supply to the fixing portion and the temperature detection portion in the power saving mode;
    a control portion that detects, based on the output of the temperature detection portion, the temperature of the fixing portion so as to perform temperature control on the fixing portion and that returns the image forming apparatus to the normal mode by performing predetermined return processing including fixing return processing in which when the return condition is satisfied, the temperature of the fixing portion is increased to the predetermined temperature;
    a photovoltaic module that receives light so as to generate electric power; and
    a power storage/supply portion that stores the power output from the photovoltaic module and that performs power supply to the temperature detection portion when the power supply from the power supply portion to the temperature detection portion is stopped,
    wherein the control portion detects, when the return condition is satisfied, the temperature of the fixing portion based on the output of the temperature detection portion, and as a temperature on return that is the detected temperature is higher, the control portion starts the fixing return processing at later timing whereas as the temperature on return is lower, the control portion starts the fixing return processing at earlier timing.

2. The image forming apparatus according to claim 1, further comprising:
    a storage portion that stores waiting time information in which a waiting time after the return condition is satisfied until the fixing return processing is started is previously determined and in which the waiting time corresponding to the temperature of the fixing portion is previously determined such that as the temperature of the fixing portion is increased, the waiting time is increased,
    wherein the control portion determines, based on the waiting time information, as a target waiting time, the waiting time corresponding to the temperature on return, and starts the fixing return processing with timing at which the target waiting time elapses after the return condition is satisfied.

3. The image forming apparatus according to claim 1, further comprising:
    an operation panel that includes an operation surface which receives an operation from a user; and
    a support member that supports the photovoltaic module such that the photovoltaic module is arranged above the operation surface of the operation panel,
    wherein the photovoltaic module is supported by the support member so as to be able to be turned with respect to the support member.

4. The image forming apparatus according to claim 3,
    wherein the support member is attached to a main body of the apparatus so as to be turned between a first position and a second position, and
    the photovoltaic module is supported by the support member such that
        the support member is turned toward the first position such that the photovoltaic module is moved in a direction in which the photovoltaic module approaches the operation surface of the operation panel,
        when the support member reaches the first position, the photovoltaic module blocks the operation surface of the operation panel and
        the support member is turned from the first position toward the second position such that the photovoltaic module is moved in a direction in which the photovoltaic module is moved away from the operation surface of the operation panel.

5. The image forming apparatus according to claim 4,
    wherein on the operation surface of the operation panel, a display panel which emits display light is arranged, and
    the photovoltaic module is a double-sided light receiving type in which both a front surface and a back surface function as light receiving surfaces.

6. The image forming apparatus according to claim 4, further comprising:
   a biasing member that biases the support member such that the support member is turned from the first position toward the second position,
   wherein a first engagement portion is provided in the photovoltaic module, and a second engagement portion which can be engaged with the first engagement portion is provided in the operation panel, and
   the first engagement portion and the second engagement portion are engaged with each other when the support member is present in the first positon.

7. The image forming apparatus according to claim 3, wherein the support member includes a rail member and a slide member which is supported by the rail member so as to be able to slide on the rail member, and
   the photovoltaic module is supported by the slide member.

8. The image forming apparatus according to claim 3, wherein the support member is formed such that a storage space is acquired therewithin, and an electric wire which is extended from the photovoltaic module is stored in the storage space.

* * * * *